United States Patent
Baer

(10) Patent No.: US 6,580,062 B2
(45) Date of Patent: Jun. 17, 2003

(54) CONTRAST FOCUS FIGURE-OF-MERIT METHOD THAT IS INSENSITIVE TO SCENE ILLUMINATION LEVEL

(75) Inventor: Richard L. Baer, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 09/865,465

(22) Filed: May 29, 2001

(65) Prior Publication Data

US 2002/0179813 A1 Dec. 5, 2002

(51) Int. Cl.[7] .................................................. G02B 7/04
(52) U.S. Cl. ............................. 250/201.2; 250/201.7; 382/255
(58) Field of Search .................... 250/201.2–201.8; 382/106, 220, 221, 255; 348/345, 349, 353

(56) References Cited

U.S. PATENT DOCUMENTS 4,945,220 A * 7/1990 Mallory et al. ............ 250/201.3
5,705,803 A * 1/1998 Lisson et al. .............. 250/201.7

OTHER PUBLICATIONS

Je–Ho Lee et al: "Implementation of Passive Automatic Focusing Algorithm for Digital Still Camera" IEEE Transactions on Consumer Electronics IEEE Inc. New York, US, vol. 41, No. 3, Aug. 1, 1995 pp. 449–454// p. 452, left–hand column, line 12–line 22.

Patent Abstract of Japan vol. 1995 No. 10, Nov. 30, 1995 & JP 07 177415A (Hitachi LTD) Jul. 14, 1995 abstract.

Kang–Sun Choi et al.: "New autofocusing technique using the frequency selective weighted median filter for video cameras" International Conference on Consumer Electronics, Los Angeles, CA Jun. 22–24, 1999 vol. 45 No. 3 pp. 820–827.

* cited by examiner

Primary Examiner—Que T. Le
Assistant Examiner—Thanh X. Luu

(57) ABSTRACT

A method, system and program product for providing automatic focus adjustment for an image device, comprising the steps of: differentiating an image along some axis to obtain a difference image; computing a variance of the difference image; determining a noise contribution to the variance; subtracting the noise contribution from the variance; using the adjusted noise variance as a factor in making the automatic focus adjustment. In a preferred embodiment, the variance is normalized, and the noise contribution is determined by determining the shot noise and the read noise.

13 Claims, 2 Drawing Sheets

CONTRAST FOCUS FIGURE-OF-MERIT METHOD THAT IS INSENSITIVE TO SCENE ILLUMINATION LEVEL

FIELD OF THE INVENTION

The present invention relates generally to automatic camera focusing mechanisms, and more particularly, to automatic focus methods that remove sensitivity to background illumination.

BACKGROUND OF THE INVENTION

All modern cameras provide some mechanism for automatic focus adjustment. The automatic focus adjustment system typically has several components, including a detector that evaluates the focus quality, an electronic controller, and a motorized lens assembly. The motorized controller implements an algorithm that causes the focal position of the lens to change until the detector determines that the focus quality has been optimized.

In a digital camera, the image detector (e.g., CCD, CMOS sensor) can also be used as the focus quality detector. The advantages of this method include the fact that no extra elements are required and the absence of registration errors between the focus sensor and the image sensor. In order to use the image sensor as a focus detector, the information from thousands to millions of image pixels must be combined to create a single metric of focus quality. The metric generally is related to the contrast in the image, i.e., as contrast increases the lens becomes more in focus, and as the lens becomes more out of focus the contrast decreases. Consequently, this technique is generally known as the contrast method of focus determination.

The spatial variance of the image is a simple statistic that can serve as an effective focus figure of merit. The spatial variance is maximized when the lens is in focus. When the lens is out of focus, the blur operates like a spatial low-pass filter, decreasing the variance. The metric can be further improved by performing a first difference on the image, along one of its axes, before computing the variance. The first difference operation makes the metric less sensitive to gradual large-scale variations in the image, which are not significantly attenuated when the lens is out of focus.

The spatial variance focus metric depends on the scene illumination level, as well as the scene content and lens focus setting. The variation of the metric with illumination intensity can cause the focus control algorithm to fail if the illumination level changes with time, as it does in the case of fluorescent lights. If the focus control algorithm is presented with a focus metric change caused by an illumination variation, it will interpret it as an error in focus position and it will make an erroneous correction to the focal position. For this reason, the ideal focus figure of merit would be insensitive to illumination intensity.

The obvious way to remove the sensitivity of the focus metric to illumination is to normalize it to the mean illumination intensity. In the case of the variance metric, this can be accomplished by dividing the variance by the square of the mean value of the image. Unfortunately, this does not eliminate the illumination sensitivity because it neglects the effects of noise.

SUMMARY OF THE INVENTION

Briefly, the present invention comprises, in one embodiment, a method for providing automatic focus adjustment for an image device, comprising the steps of: differentiating an image along some axis to obtain a difference image; computing a variance of the difference image; determining a noise contribution to the variance; subtracting the noise contribution from the variance; using the adjusted noise variance as a factor in making the automatic focus adjustment.

In a further aspect of the present invention, the step is provided of normalizing the variance.

In a further aspect of the present invention, the normalization of the variance is performed on the variance resulting after performing the subtracting the noise contribution step.

In a further aspect of the present invention, the determining the noise contribution step comprises determining the shot noise contribution to the variance; and wherein the subtracting the noise contribution step comprises subtracting the shot noise.

In a further aspect of the present invention, the determining the noise contribution step comprises determining the read noise; and wherein the subtracting the noise contribution step comprises subtracting the read noise.

In a further aspect of the present invention, the determining the noise contribution step comprises determining the read noise; and wherein the subtracting the noise contribution step comprises subtracting the read noise.

In a further aspect of the present invention, the difference image was determined by subtracting an image from an offset version of itself; and wherein the determining the shot noise contribution to the variance step comprises subtracting the shot noise from the image from the shot noise in the offset version of the image.

In a further aspect of the present invention, the determining the shot noise contribution to the variance step comprises determining the contribution to the variance of the shot noise in the two images that are subtracted to make the difference image, and adding the variances together in order to obtain the total contribution of shot noise to the variance of the difference image.

In a further aspect of the present invention, the determining the read noise contribution to the variance step comprises multiplying the read noise determined from a single image collected in the dark by two.

In a further embodiment of the present invention, a system is provided for automatic focus adjustment for an image device, comprising: a processor designed to compute a variance of a difference image, determine a noise contribution to the variance, subtract the noise contribution from the variance, and to generate a control signal; a lens; and a component for automatically adjusting the focus of the lens, using said control signal as a factor.

In a further aspect of the present invention, the processor normalizes the variance.

In a further aspect of the present invention, the processor determines the noise contribution by determining the shot noise contribution to the variance and subtracts the shot noise from the variance.

In a further embodiment of the present invention, a program product is provided for automatic focus adjustment for an image device, comprising computer readable code for performing the method steps of: computing a variance of a difference image; determining a noise contribution to the variance; and subtracting the noise contribution from the variance.

DETAILED DESCRIPTION OF THE PREFERRED EMBODIMENTS

The present invention is a new method and system and program product for removing the sensitivity of the focus figure of merit to illumination level that correctly accounts for the effects of noise. Two different types of noise predominate in digital camera images: shot noise and read noise. Shot noise is a natural feature of a discrete arrival process. It arises in photography because of the quantized nature of light. If a pixel receives an average of "N" photons of light during an exposure period, then the standard deviation of the number of photons counted will be the square root of "N" because of the effect of shot noise. Read noise is a term that describes the additive noise that is contributed by electronic amplification, dark current, and other sources of electronic noise. Read noise has a constant standard deviation and does not depend on signal level.

The focus figure of merit responds to both read noise and shot noise. This can be illustrated by considering the response to a flat uniformly illuminated scene. In the absence of scene variation, the total variance will be the sum of the variances of the shot noise and the read noise. Applying a first difference operation will increase the variance by a factor of two, but it will have no other effect. If the metric is normalized to the square of the mean, then the focus metric will vary as: FOM ~(Rn+sqrt(N))/N. As the illumination intensity goes to zero, the focus metric will become infinite because the read noise and the shot noise terms do not decrease as rapidly as the mean signal term. In order to implement the technique of the present invention of removing the sensitivity of the focus figure of merit to illumination level, the camera must be well enough characterized to determine both the read noise level and the system gain coefficient. The system gain coefficient is a measure of the number of electrons per digital level in the camera. In this method, the noise contributions to the focus figure of merit are calculated separately and subtracted off before the metric is normalized to the illumination intensity.

Figure 1:
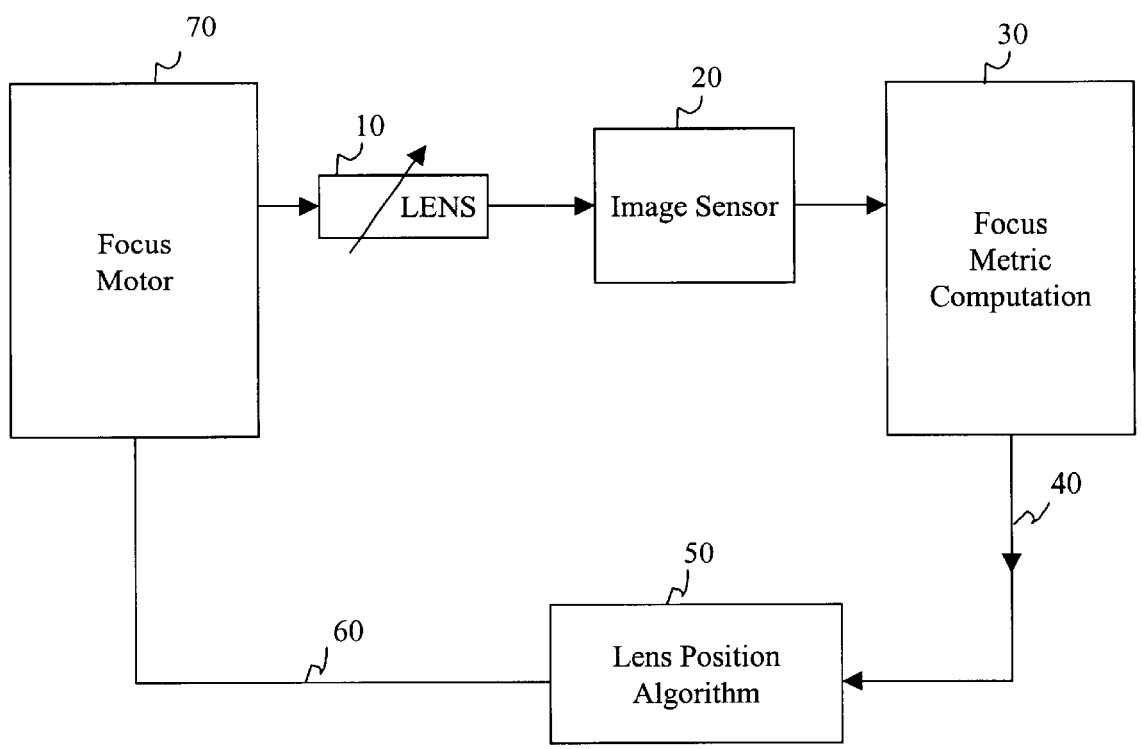
FIG. 1 is a schematic block diagram of one embodiment of the present invention.

Referring now to FIG. 1, there is shown a preferred embodiment for implementing the present invention. The embodiment of FIG. 1 includes a lens 10 with an electronic focus. The embodiment further includes an image sensor 20 that receives an image from the lens 10. The image sensor 20 provides an input to a focus metric computation processor 30. A control signal from the processor 30 is provided on line 40 to a lens position algorithm 50. The lens position algorithm 50 determines how the lens should be adjusted based on the focus metric control signal and provides a control signal on line 60 to a focus motor 70. The focus motor 70 then operates to focus the lens 10 automatically.

Figure 2:
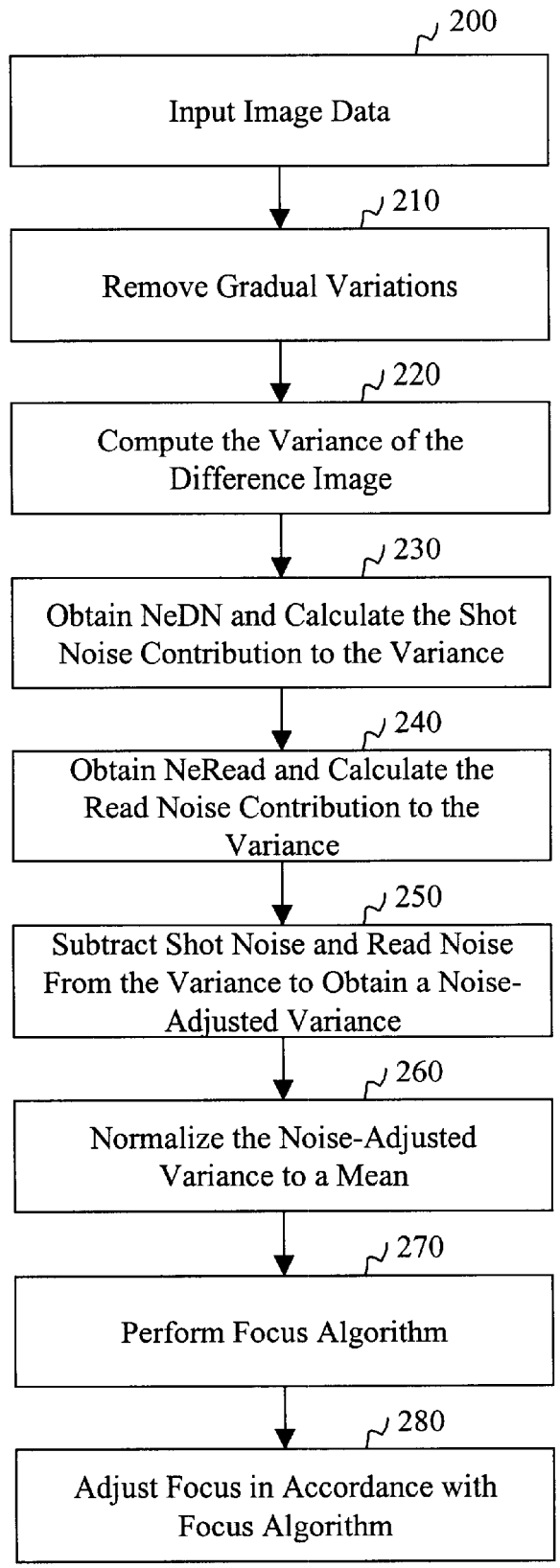
FIG. 2 is a flow chart of a preferred operation of the system and method of the present invention.

FIG. 2 shows a preferred embodiment of a method utilized in accordance with the present invention in order to remove the sensitivity of the focus figure of merit to illumination level that correctly accounts for the effects of noise. The first step in the method at block 200 is to receive input image data from the image sensor 20. The method then moves to block 210 wherein the gradual transitions in the image are attenuated and the edges are amplified. This operation is typically accomplished by taking a first difference of the image along one of its principle axes. The first difference can be obtained by subtracting the image from itself, offset by some fixed amount. This operation is represented in terms of an equation as follows:

$$dimg = imgf[(O:sx-2),*] - imgf[(1:sx-1),*].$$

In the foregoing equation, imgf[a:b,*] represents the subset of the original image that includes columns "a" through "b" in their entirety. The parameters (O:sx-2) and (1:sx-1) represent an example of an offset to obtain the difference image. The term "sx" represents the width of the image.

The method then moves to block 220 wherein the variance of the difference image is computed. The variance of the difference image is typically obtained by taking the mean of the square of the pixel values minus the square of the mean of the pixel values. This process is represented by the equation:

$$var = \sigma\,(dimg).$$

The method then proceeds to block 230 wherein NeDN is obtained and the shot noise contribution to the variance is calculated. Note that the shot noise is the noise that results from the uncertainty of the process of random arrivals of packets of light. Note that Ne equals the number of electrons and DN equals the digital number. Accordingly, NeDN is equal to the number of electrons per digital level coming out of an A/D converter. This number NeDN is determined, a priori, by the camera parameters and settings for the particular camera of interest. Thus, "NeDN" is the system gain coefficient in units of electrons per digital number (A/D count).

The calculation of the shot noise contribution to the variance can be represented by the following equations:

$$shotN1 = <NeDN * imgf[(0:sx-2),*]>/NeDN^2$$

$$shotN2 = <NeDN * imgf[(1:sx-1),*]>/NeDN^2.$$

Note that the operation "< >" computes the mean value, which is the sum of the pixel values in the specified range divided by the number of pixels in the sum. In the case of shotN1, it is the sum from columns 0 through (sx-2), including all rows. Note that in view of the parameters for imgf, it can be seen that shotN2 is offset from shotN1.

The method then moves to block 240 wherein the NeRead is obtained, and the read noise contribution to the variance is calculated. Note that NeRead is the white noise of the system, and does not contribute to determining the focus position. This calculation can be represented as:

$$varRead = (NeRead/NeDN)^2$$

"NeRead" is the read noise level in equivalent electrons.

The method then moves to block 250 wherein the shot noise and the read noise are subtracted from the variance to obtain a noise-adjusted variance. This operation may be represented by the equation $$var' = var - shotN1 - shotN2 - 2*varRead.$$

It should be noted that 2*varRead represents twice the variance of the read noise in a single image collected in the dark.

The method then moves to block 260 wherein the noise-adjusted variance var' is normalized. By way of example, but not by way of limitation, the normalization process can be represented by the following equation $$FOM = var'/[mean(imgf)]^2$$

Note that FOM is the focus figure of merit. The FOM could also be composed of higher order moments. For example the variance could be replaced with an operator defined as $<x^4>-<x>^4$, and the mean could be replaced with the square of the mean.

The output from block 260 comprises the control signal on line 40 to the lens position algorithm block 50. The focus algorithm is then performed. Note that there are a variety of different focus algorithms available, depending on the type of lens, and the method of adjusting the focus of the lens. In this regard, various different focus motors in block 70 would have different focus algorithms that would be used. The output from the lens position algorithm 50 is then applied on line 60 to the focus motor 70. The actual adjustment of the electronically controlled lens 10 in accordance with this focus algorithm is represented by block 280 in FIG. 2.

It should be noted that the simplest method to obtain NeDN and NeRead is to measure the temporal variance and the mean with the shutter closed and at a moderate level of uniform illumination. The temporal variance in the dark yields the read noise, while the slope of the variance versus the mean function yields the system gain. These parameters would have to be corrected for any changes in the electronic gain setting.

Accordingly, it can be seen that a method has been provided that yields a focus metric that is substantially completely insensitive to changes in illumination level. This feature enables the focus control algorithm to operate correctly without interference from time-varying light sources.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for providing automatic focus adjustment for an image device, comprising the steps of:
   differentiating an image along some axis to obtain a difference image;
   computing a variance of the difference image;
   determining a noise contribution to the variance;
   subtracting the noise contribution from the variance to obtain an adjusted noise variance;
   using the adjusted noise variance as a factor in making the automatic focus adjustment.

2. The method as defined in claim 1, further comprising the step of normalizing the variance.

3. The method as defined in claim 2, wherein the normalization of the variance is performed on the variance resulting after performing the subtracting the noise contribution step.

4. The method as defined in claim 1, wherein the determining the noise contribution step comprises determining the shot noise contribution to the variance; and wherein the subtracting the noise contribution step comprises subtracting the shot noise.

5. The method as defined in claim 2, wherein the determining the noise contribution step comprises determining the read noise; and wherein the subtracting the noise contribution step comprises subtracting the read noise.

6. The method as defined in claim 1, wherein the determining the noise contribution step comprises determining the read noise; and wherein the subtracting the noise contribution step comprises subtracting the read noise.

7. The method as defined in claim 4, wherein the difference image was determined by subtracting an image from an offset version of itself; and wherein the determining the shot noise contribution to the variance step comprises subtracting the shot noise from the image from the shot noise in the offset version of the image.

8. The method as defined in claim 4, wherein the determining the shot noise contribution to the variance step comprises determining the contribution to the variance of the shot noise in the two images that are subtracted to make the difference image, and adding the variances together in order to obtain the total contribution of shot noise to the variance of the difference image.

9. The method as defined in claim 6, wherein the determining the read noise contribution to the variance step comprises multiplying the read noise determined from a single image collected in the dark by two.

10. A system for providing automatic focus adjustment for an image device, comprising:
    a processor designed to compute a variance of a difference image, determine a noise contribution to the variance, subtract the noise contribution from the variance, and to generate a control signal;
    a lens; and
    a component for automatically adjusting the focus of the lens, using said control signal as a factor.

11. The system as defined in claim 10, wherein the processor normalizes the variance.

12. The system as defined in claim 10, wherein the processor determines the noise contribution by determining the shot noise contribution to the variance and subtracts the shot noise from the variance.

13. A program product for providing automatic focus adjustment for an image device, comprising computer readable code for performing the method steps of:
    computing a variance of a difference image;
    determining a noise contribution to the variance; and
    subtracting the noise contribution from the variance to obtain an adjusted noise variance;
    using the adjusted noise variance as a factor in making the automatic focus adjustment.

* * * * *